No. 700,997. Patented May 27, 1902.
A. P. WOLFE.
DOUBLE SEAMING MACHINE.
(Application filed July 9, 1901.)
(No Model.) 4 Sheets—Sheet 3.
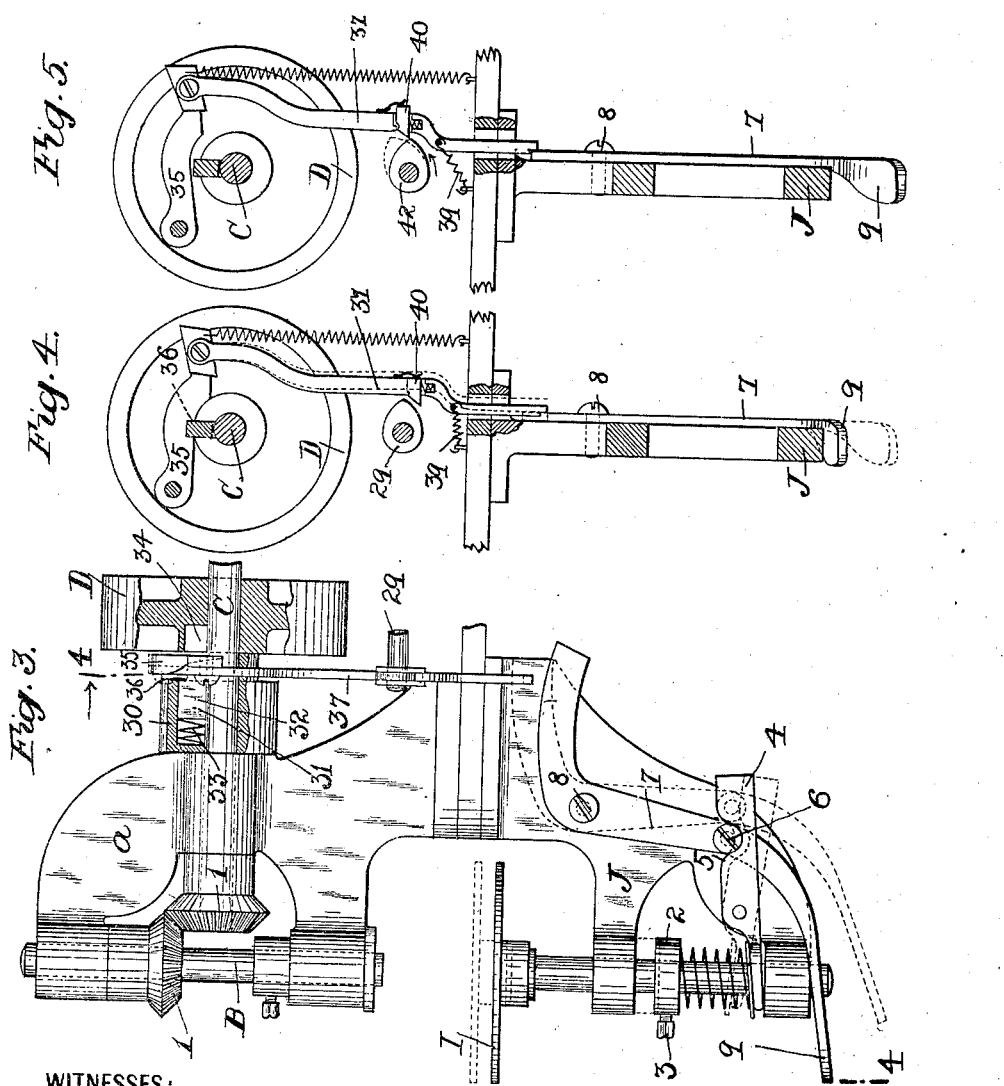
WITNESSES:
INVENTOR:
Arthur P. Wolfe
BY
ATTORNEY

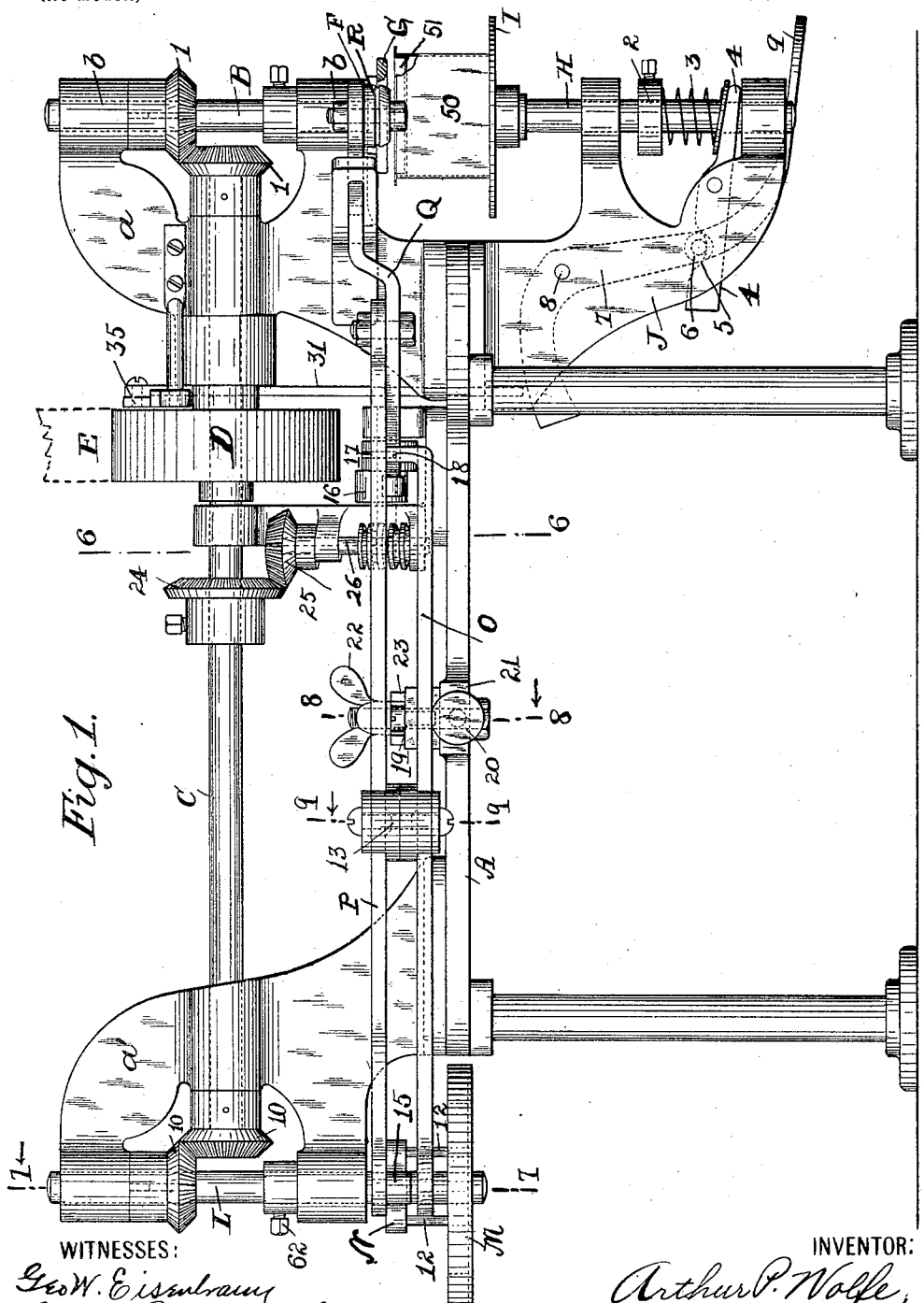

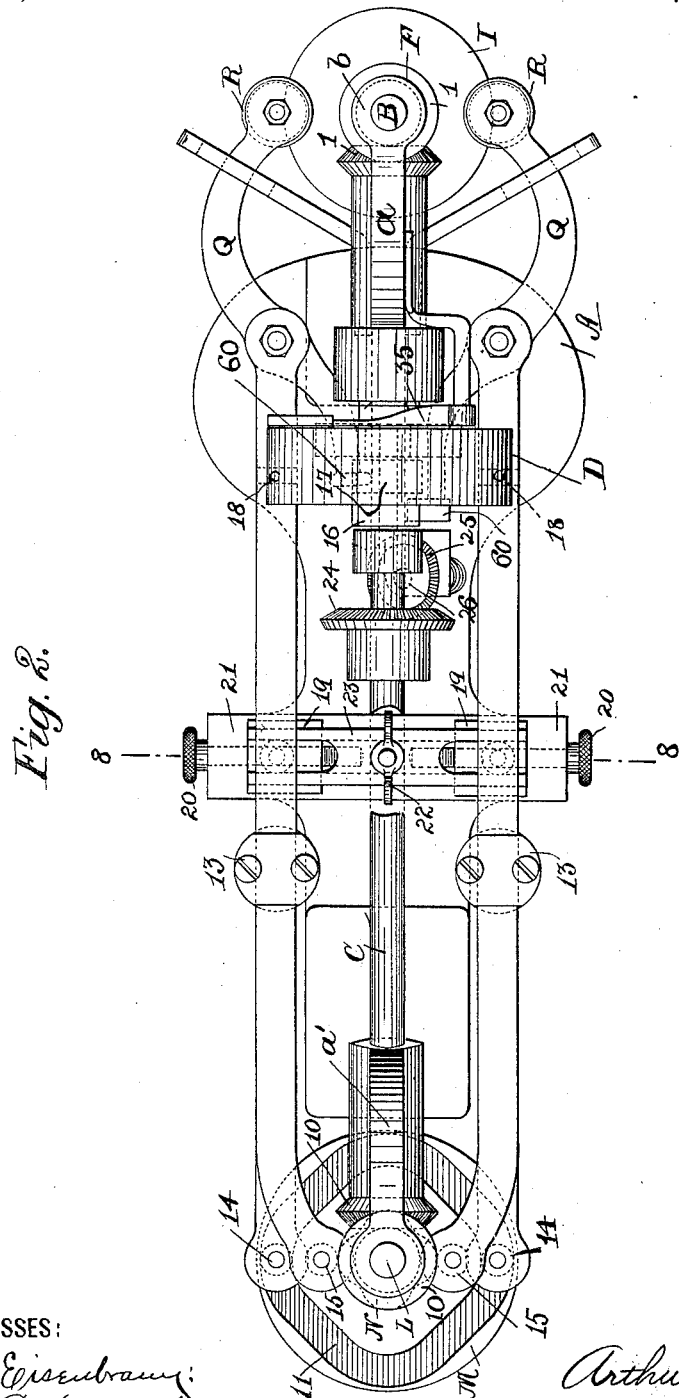

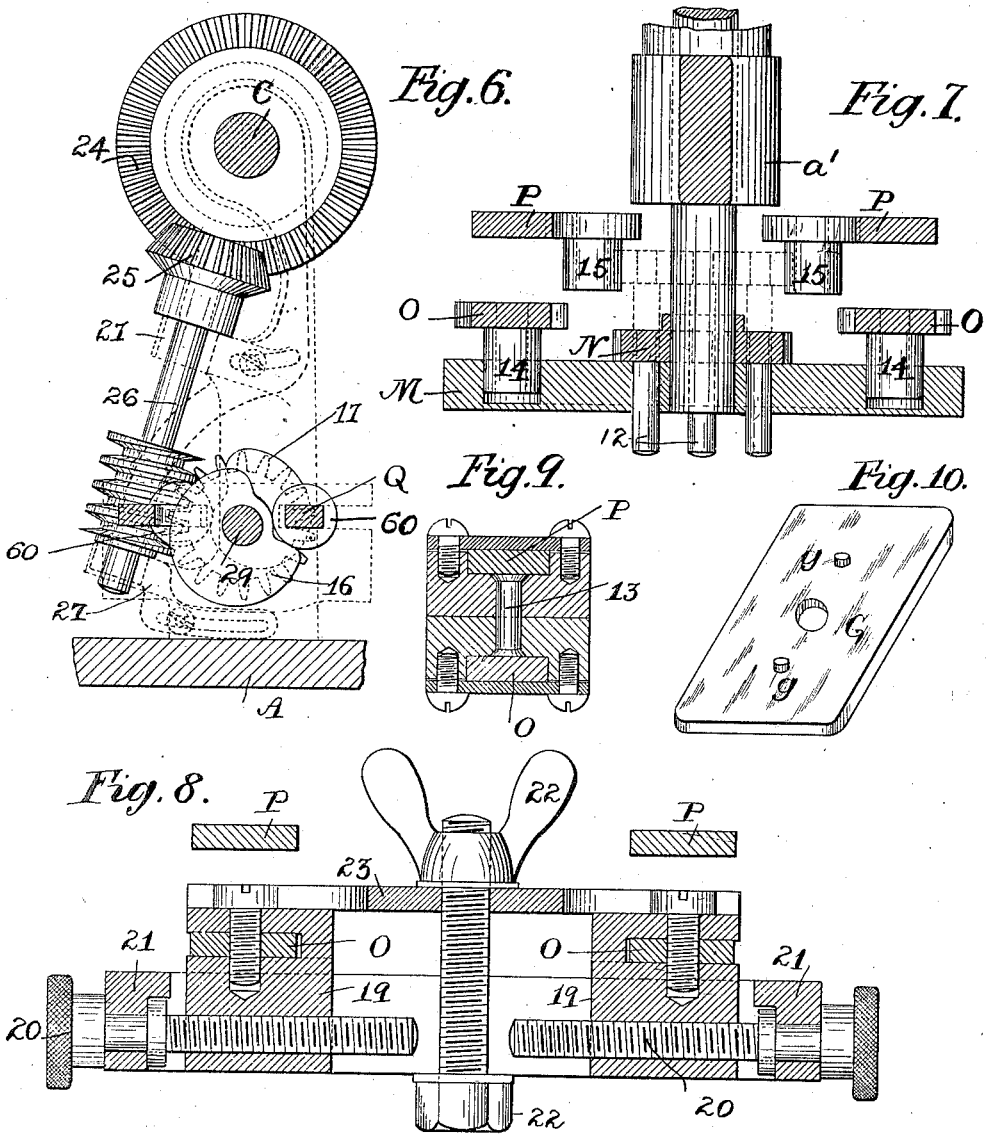

UNITED STATES PATENT OFFICE.

ARTHUR P. WOLFE, OF BROOKLYN, NEW YORK.

DOUBLE-SEAMING MACHINE.

SPECIFICATION forming part of Letters Patent No. 700,997, dated May 27, 1902.

Application filed July 9, 1901. Serial No. 67,690. (No model.)

*To all whom it may concern:*

Be it known that I, ARTHUR P. WOLFE, a citizen of the United States of America, residing at the borough of Brooklyn, in the county of Kings and State of New York, have invented certain new and useful Improvements in Double-Seaming Machines, of which the following is a specification.

My invention has reference to improvements in machines for double-seaming sheet-metal boxes or receptacles, and has for its object to provide mechanism adapted for the seaming of receptacles of all shapes and sizes without the use of a separate cam for each size and shape of the particular receptacle to be produced. This mechanism, as will be seen in the further description, is so constructed that if the machine is set to follow the particular periphery or outline of a receptacle then the varying sizes of this shape can be seamed by adjusting the positions of the main fulcrums of the levers without requiring a new cam.

The nature of my invention will best be understood when described in connection with the accompanying drawings, in which—

Figure 1 represents a side elevation of a machine embodying my improvements. Fig. 2 is a plan or top view thereof. Fig. 3 is a partial side elevation, partly in section, showing the starting mechanism. Fig. 4 is a vertical section on the line 4 4, Fig. 3. Fig. 5 is a similar section showing the machine in its starting position. Fig. 6 is a vertical section, on an enlarged scale, on the line 6 6, Fig. 1. Fig. 7 is an enlarged vertical section on the line 7 7, Fig. 1, part being broken away. Fig. 8 is an enlarged vertical section on the line 8 8, Fig. 2. Fig. 9 is an enlarged vertical section on the line 9 9, Fig. 1. Fig. 10 is a perspective view of the form for the receptacle.

Similar letters and numerals of reference designate corresponding parts throughout the several views of the drawings.

Referring to the drawings, the letter A designates the bed-plate of the machine, which may be of any suitable construction adapted to support the operating parts. At the front end of the frame a chuck-spindle B is mounted in suitable bearings *b b*, attached to a bracket *a*, secured to the bed-plate A, and said spindle is rotated by means of bevel-gears 1 1, rigidly mounted on said spindle and on the driving-shaft C of the machine. The said driving-shaft has bearings at one end in the bracket *a* and at its other end in a bracket *a'*, located at the rear of the bed-plate A. The driving-shaft C has mounted loosely thereon a pulley D, driven by a belt E and adapted to be thrown into and out of engagement with the shaft by means hereinafter to be described. The lower end of the chuck-spindle B is provided with a means, as F, adapted to receive the interchangeable forms G, Fig. 10, corresponding to the particular shape of box to be seamed. In the present instance I have shown the spindle provided with a plate having sockets which are adapted to receive pins *g* on the forms. Of course any other means could be employed for immovably affixing the form to the chuck-spindle.

Below and in line with the chuck-spindle B is arranged the platen-spindle H, carrying the platen I, upon which the box to be seamed is placed, said spindle being adapted to be moved toward and from the form by the following mechanism: The platen-spindle is longitudinally guided in two bearings arranged in a bracket J, suspended from the frame of the machine, and is provided with an adjustable collar 2, interposed between the bearings and resting on a spring 3, having its lower end engaged by a lever 4. This lever 4 is provided with a depression 5, in which a roller-stud 6 rests, the said stud being carried by a foot-lever 7, pivoted at 8 to the bracket J and having at its forward end a projecting treadle 9, placed in position to be engaged by the foot of the operator. It will now be readily understood that if this foot-lever be depressed the lever 4 is turned about its fulcrum by the roller-stud 6 and lifts the platen I, on which the body of the box, with the bottom inserted, as usual, has been placed, so as to confine the body and bottom of the box between the platen and the form for the purpose of locking them to the chuck-spindle for the ensuing operation of the seaming-rolls. The lever 4 acts against the spring 3, so as to present a yielding support, which compensates for slight variations in the height of the box-body. At the rear of the machine there is located a cam-spindle L, arranged vertically and connected by gears 10 10 with the shaft C, and at the lower end of said spindle L is mounted an internal cam-disk M, having therein a cam-groove 11. Above said internal cam is located a cam N, adapted to slide in the longitudinal direction of the spindle L and provided with pins 12, passing through the internal cam M and having a slidable motion relative to the same. In connection with the cam M there are arranged two levers O O on opposite sides of the machine, which carry movable fulcrums 13, and in connection with the cam N there are also arranged two levers P P, pivoted to the fulcrums 13, each set of said levers being provided at their rear ends with roller-studs 14 14 and 15 15, respectively, the studs 14 engaging the cam-groove in the cam M and the studs 15 being adapted to engage the external periphery of the cam N. The cam N can be moved toward and from the cam M, although it always turns with the same. When the cam N is lowered, so as not to be in contact with the roller-studs 15 of levers P, then the said levers P are not influenced by the movements of said cam N. The upper pair of levers P has fulcrumed to its ends a pair of levers Q, which carry at their outer ends the double-seaming rolls R and which said latter levers are actuated by two separate cams 16 and 17, located at their rear ends. The upper and lower sets of levers are arranged to be coupled together by means of pins 18 18, so as to act as one pair of levers, which adapts the machine for any square box that it has capacity for, provided the cam N is lowered, so as not to engage the levers P. Between the box-form G and the fulcrum 13 the lower set of levers O O are fulcrumed to slides 19 19, transversely mounted in the bed-plate A and adapted to be moved laterally by hand-screws 20 20, engaging said slides and passing through bearings 21, attached to or forming part of the bed-plate. A central thumb-screw 22, passing through a strap 23, is provided for clamping the parts of the slides firmly together, so as to prevent accidental movement of the hand-screws 20 after adjustment. The cams 16 and 17 for the seaming-roll levers Q Q are turned through one revolution for each eight revolutions of the driving-shaft C by the following mechanism: Upon the shaft C is mounted a bevel-gear 24, meshing with a second bevel-gear 25, rigidly mounted upon a vertical worm-shaft 26, mounted, preferably, in a swinging frame 27, hung from the shaft. The worm of the shaft 26 engages with a worm-gear 28, mounted on the cam-shaft 29. By arranging the worm-shaft in a swinging frame the mechanism is adapted for different speeds by interchanging the gears 28. In order to enable the operator to have full use of both hands, I provide a starting and stopping mechanism which is thrown into operation by the depression of the foot-treadle and automatically arrests the motion of the machine after the desired number of revolutions of the chuck have been effected. To this end the driving-pulley D, previously referred to, is loosely mounted on the driving-shaft C, and on said shaft adjacent to the pulley D is rigidly mounted a collar 30, having therein a longitudinal keyway 31, containing a key 32, subjected to the action of a spring 33, tending to force the same in the direction of the pulley D. The hub of the said pulley contains a socket 34, adapted to be entered by the key 32 for the purpose of locking the pulley to the shaft. The key 32 is adapted to be held out of the socket 34 by means of a latch 35, hinged to the bracket a and adapted to engage the key 32, which latter has a shoulder 36, adapted to abut against said latch. The latch 35 has at its free end a hanging rod 37, whose end is adapted to lie in the path of the inner end of the foot-lever 7. A spring 38 normally holds the latch down against the key. A second spring 39 holds the connecting-rod 37 in a vertical position, so as to insure that its end is directly above the lever 7. The rod 37 is provided with an inclined tappet 40, which is mounted to slide transversely in an opening in said rod, but has therein a recess engaged from above by a toe 41 on the rod, so that if engaged from below it is locked by the toe and recess, but if engaged from above it can recede. A cam 42 is arranged to engage with said tappet 41, and said cam is mounted on the cam-shaft 29, and consequently turns once for each eight revolutions of the driving-shaft C.

When the machine is in its position of rest, the parts are as shown in full lines in Figs. 3 and 4—that is to say, the key 32 is disengaged from the driving-pulley D and the said pulley runs loosely on the shaft. When the foot-lever 7 is depressed, as shown in dotted lines in Figs. 3 and 4, the rod 37 is lifted, bringing the tappet 40 up against the cam 42. The tappet 40 slides away from the cam, and the latch 35 is raised to the position shown in Fig. 5, thereby clearing the key 32 from the latch 35 and permitting the said key to couple the driving-pulley to the shaft. The machine now starts. During the eight or other desired number of revolutions of the driving-shaft the cam 42 makes one complete revolution. Just before the completion of this revolution it engages from below with the tappet 40, and thereby moves the rod 37 laterally out of the vertical, since the tappet now binds in its socket, thus throwing the end of the rod off the end of the foot-lever 7. Spring 38 pulls latch 35 downward, causing the latter to engage with the shoulder of key 32 to force the same out of the socket in the driving-pulley D.

I will now proceed to describe the operation of the machine, assuming that a square box is to be double-seamed. A form (such as G, but rectangular) is attached to the chuck-spindle B, which is adapted to accurately fit into the panel of the bottom 51 of the box 50. The two pairs of levers O and P are locked together by dropping in the pins 18, as indicated in Fig. 1, and the top cam N on the cam-spindle L is lowered, so as to clear the upper set of levers P. The lower internal cam M now individually actuates the two sets of levers O and P as if they were a single pair. The machine is then turned through nearly eight revolutions of the shaft C, thereby causing the cams 16 and 17 to turn nearly through one revolution, which is their position for the maximum throw of the seaming-levers Q, which carry at their front ends the seaming-rolls R. This movement represents the length of what is technically called the "edge" of the bottom of the box—in other words, the metal of the bottom, which is to be rolled in and forms the seams. The hand-screws 20 are then turned so as to bring either of the fulcrum-slides 19 of the lower levers O into such positions as to press both the seaming-rolls against the form and the back roller-studs 61 of said levers against the faces of the cams 16 and 17. The machine is then turned sufficiently to complete the eight revolutions of the shaft C, and in so doing the clutch mechanism is thrown out, as hereinbefore described, by bringing the cams 16 and 17 into the positions shown in Figs. 1 and 6, and consequently the seaming-rolls R are relieved of the pressure of the cams 16 and 17, and the roller-studs 60 on the seaming-levers Q drop into the recesses in cams 16 and 17, which gives the seaming-levers an outward movement. This outward movement of the seaming-rolls represents the edge of the bottom to be seamed plus a little clearance to facilitate the slipping of the box and its bottom into the machine. The treadle 9 is now depressed, which causes the box and its bottom to be carried upward and pressed against the form G. The movement of the treadle at the same time sets the machine into operation in the manner previously described.

For double-seaming a rectangular box, as 50, a corresponding rectangular form G is attached to the chuck-spindle B. The two pairs of levers O and P are locked together, as before, by means of the pins 18. The hand-screws 20 are then turned so as to adjust the slides 19 to bring the rolls R in touch with the two shorter sides of the box after the machine has been turned nearly eight revolutions, as described in connection with the seaming of a square box. This adjustment would set the machine to follow the outline of a square box as square as the rectangular box is long. The machine is then turned through a quarter-turn, presenting the longer sides of the box to the rolls, and the pins 18 are then removed and the top cam N is raised, so as to be in line with the roller-studs on the two upper levers P. The movable fulcrums 13, connecting the upper and lower pairs of levers O and P, are then moved in a direction that will bring the ratio of the upper levers P so that the roller-studs on the said levers will touch the upper cam N and also cause the seaming-rolls R to contact with the form on the chuck-spindle on the long side of the latter. Adjustment for the height of the body of the box is effected by loosening the collar 2 and adjusting the spindle H so that when the treadle is pushed down the body of the box will be held firmly against the box to be seamed.

In Fig. 2 it will be seen that the internal cam M has a circular periphery and that the shaft L, Fig. 1, is longitudinally adjustable by means of a collar and a set-screw 62. In order to double-seam a round box, a round form is placed upon the chuck-spindle B, the upper and lower levers P and O are locked together, as before, and the cam-spindle, together with its attached cam M, is lowered, thus enabling the operator to press the lower set of levers O outwardly. The cam-spindle L is then raised, and the roller-studs on said levers then bear against the outer periphery of the internal cam. The adjustment for the diameter of the round box is effected by turning the hand-screws 20 so as to either bring together or spread apart the slides in which the lower pair of levers O turns.

In order to double-seam an oval, triangular, or other shape of box, it is simply necessary to replace the upper cam on the cam-spindle L with a cam which has been laid off to the proper shape to act in unison with the internal cam M, so as to give to the seaming-rolls the motion necessary for following the periphery of the special shape.

The size of each shape is determined in all instances by the position of the slides 19 in the machine, which are drawn apart or toward each other to bring the fulcrums of the lower levers farther apart or closer together, making a proportionate change in the distance between the seaming-rolls R.

What I claim as new is—

1. In a machine for seaming boxes, the combination of two sets of compensating levers, a pair of seaming-levers fulcrumed to one set of said compensating levers, adjustable fulcrums carried by one set of levers, two cams adapted to engage respectively with said two sets of levers, means for laterally adjusting the fulcrum-carrying levers, means for moving the seaming-levers toward and from the form, and means for connecting the two sets of compensating levers, substantially as and for the purpose specified.

2. In a machine for seaming boxes, the combination of an upper and lower set of compensating levers, a pair of seaming-levers fulcrumed to the upper set of compensating levers and carrying seaming-rolls at their outer ends, rotary cams adapted to act on the inner ends of said seaming-levers for moving the seaming-rolls toward and from the box-form, adjustable fulcrums carried by the lower set of levers and to which the upper set of levers is pivoted, a cam-shaft, a cam adapted to engage with the lower set of levers, an upper cam slidably mounted on the shaft and adapted to be thrown into and out of contact with the upper set of levers, means for laterally adjusting the lower set of levers, and means for connecting and disconnecting the two sets of levers, substantially as and for the purpose specified.

3. In a machine for seaming boxes, the combination of two sets of compensating levers, a pair of seaming-levers fulcrumed to one set of said compensating levers, and carrying the seaming-rolls, cams adapted to act on said seaming-levers for causing the rolls to be moved toward and from the form, means for imparting a reduced movement of rotation to said cams from the driving-shaft of the machine, adjustable fulcrums for one set of levers carried by the other set of levers, two cams adapted to engage respectively with said two sets of levers and one of said cams being adapted to be thrown into and out of engagement with its corresponding set of levers, means for laterally adjusting the fulcrum-carrying set of levers, and means for connecting the two sets of compensating levers, substantially as described.

4. In a machine for seaming boxes, the combination of an upper and lower set of compensating levers, a pair of seaming-levers fulcrumed to the upper set of compensating levers and carrying seaming-rolls at their outer ends, cams adapted to act on the inner ends of said seaming-levers, adjustable fulcrums carried by the lower set of compensating levers and to which the upper set of levers is pivoted, cams adapted to engage respectively with the upper and lower sets of compensating levers and of which the upper cam is adapted to be thrown into and out of connection with the upper set of levers, means for laterally adjusting the lower set of levers, means for connecting and disconnecting the two sets of levers, a driving-shaft, a connection between said driving-shaft and the cams for the seaming-levers, a treadle, a clutch mechanism, and operative connections between said treadle and the clutch mechanism permitting the treadle to be partially depressed for the purpose of pressing the box firmly against the form before the machine is set in motion, substantially as described.

5. In a machine for seaming boxes, the combination of two sets of compensating levers, a pair of seaming-levers fulcrumed to one set of said compensating levers, cams adapted to act on said seaming-levers for causing their seaming-rolls to be moved toward and from the form, means for imparting a reduced and variable movement of rotation to said cams from the driving-shaft of the machine, adjustable fulcrums for one set of levers carried by the other set of levers, two cams adapted to engage respectively with said two sets of levers and one of said cams being adapted to be thrown into and out of engagement with its corresponding set of levers, means for laterally adjusting the fulcrum-carrying set of levers, and means for connecting the two sets of compensating levers, substantially as described.

6. In a machine for seaming boxes, the combination with the seaming-levers, of two sets of compensating levers actuated at one end by cams, and one set of said levers carrying the seaming-levers, and means for coupling the two sets of levers together to act as a unit, substantially as described.

7. In a machine for seaming boxes, the combination with the seaming-levers, of two sets of compensating levers actuated at one end by cams, and said sets of levers being fulcrumed together, and one set carrying the seaming-levers, means for coupling and uncoupling the levers at a point between the fulcrums and the connection with the seaming-levers, and means for laterally adjusting one set of levers about its fulcrum, substantially as described.

8. In a machine for seaming boxes, the combination with the seaming-levers, of two sets of compensating levers, two cams for actuating said levers, of which the one cam is adjustable toward and from the other while in continuous connection with the same, and means for coupling the two sets of levers together to act as a unit, substantially as described.

9. In a machine for seaming boxes, the combination with the seaming-levers, of two sets of compensating levers, of which the one set carries the seaming-levers, two cams for actuating said compensating levers, of which the one cam is adjustable toward and from the other while in continuous connection with the same, while the other cam is movable to clear the ends of its corresponding set of levers, and means for coupling the two sets of levers together to act as a unit, substantially as described.

In testimony whereof I have hereunto set my hand in the presence of two subscribing witnesses.

ARTHUR P. WOLFE.

Witnesses:
EUGENIE P. HENDRICKSON,
A. FABER DU FAUR, Jr.